(12) United States Patent
Kararoguz

(10) Patent No.: US 9,479,814 B2
(45) Date of Patent: Oct. 25, 2016

(54) TELEVISION SYSTEM AND METHOD FOR PROVIDING COMPUTER NETWORK-BASED VIDEO

(71) Applicant: Broadcom Corporation, Irvine, CA (US)

(72) Inventor: Jeyhan Kararoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 117 days.

(21) Appl. No.: 14/156,974

(22) Filed: Jan. 16, 2014

(65) Prior Publication Data

US 2014/0137156 A1 May 15, 2014

Related U.S. Application Data

(62) Division of application No. 12/273,686, filed on Nov. 19, 2008, now abandoned.

(60) Provisional application No. 61/095,022, filed on Sep. 8, 2008.

(51) Int. Cl.
*H04N 7/173* (2011.01)
*H04N 21/4147* (2011.01)
(Continued)

(52) U.S. Cl.
CPC ...... *H04N 21/4147* (2013.01); *H04N 7/17318* (2013.01); *H04N 7/17336* (2013.01);
(Continued)

(58) Field of Classification Search
CPC ........... H04N 21/43615; H04N 7/106; H04N 7/17318; H04N 21/47202; H04N 7/18; H04N 5/4401; H04N 21/4622; H04N 21/435; H04N 21/84; H04N 5/50; H04N 5/44543; H04N 21/4383; H04N 7/16; H04N 21/40; H04N 21/432; H04N 21/4325; H04N 21/433; H04N 21/4331; H04N 21/4332; H04N 21/4333; H04N 21/4334; H04N 21/4335; H04N 21/4349; H04N 21/438; H04N 21/443; H04N 21/4432; H04N 21/4435; H04N 21/4436; H04N 21/41; H04N 21/426; H04N 21/42607; H04N 21/42615; H04N 21/42623; H04N 21/4263; H04N 21/42638; H04N 21/42646; H04N 21/42653; H04N 21/42661; H04N 21/42669; H04N 21/42676; H04N 21/42684; H04N 21/42692
See application file for complete search history.

(56) References Cited

U.S. PATENT DOCUMENTS 5,990,883 A 11/1999 Byrne
2001/0049720 A1 12/2001 Eyer
(Continued)

FOREIGN PATENT DOCUMENTS

CN 1870717 11/2006
CN 2854953 1/2007
(Continued)

OTHER PUBLICATIONS

European Patent Office, Communication with Eurropean Search Report, in application No. 09010741.8 dated Nov. 4, 2010.
(Continued)

*Primary Examiner* — Ngoc Vu
(74) *Attorney, Agent, or Firm* — Brinks Gilson & Lione

(57) ABSTRACT

A television system and method for providing computer network-based video. Various aspects may, for example, comprise a television system and method for providing both standard television video combined with computer network-based video, serially and/or concurrently. Various aspects may also comprise a user interface system and method for interacting with a user regarding the presentation and/or control of computer network-based video.

18 Claims, 5 Drawing Sheets

(51) Int. Cl.
*H04N 21/2743* (2011.01)
*H04N 21/462* (2011.01)
*H04N 21/472* (2011.01)
*H04N 21/482* (2011.01)
*H04N 21/61* (2011.01)
*H04N 21/4405* (2011.01)

(52) U.S. Cl.
CPC ...... *H04N21/2743* (2013.01); *H04N 21/4405* (2013.01); *H04N 21/4622* (2013.01); *H04N 21/47202* (2013.01); *H04N 21/482* (2013.01); *H04N 21/4821* (2013.01); *H04N 21/6125* (2013.01)

(56) References Cited

U.S. PATENT DOCUMENTS

| | | |
|---|---|---|
| 2002/0095689 A1 | 7/2002 | Novak |
| 2002/0104099 A1 | 8/2002 | Novak |
| 2004/0117842 A1 | 6/2004 | Karaoguz et al. |
| 2007/0199019 A1 | 8/2007 | Angiolillo et al. |
| 2008/0043832 A1* | 2/2008 | Barkley ......... H04N 21/234327 375/240 |
| 2009/0113472 A1* | 4/2009 | Sheth .................. G06F 17/3089 725/34 |
| 2010/0031193 A1 | 2/2010 | Stark et al. |

FOREIGN PATENT DOCUMENTS

| | | |
|---|---|---|
| KR | 2003-0073332 | 9/2003 |
| KR | 2008-0037979 | 4/2008 |
| WO | WO0033576 A1 | 6/2000 |

OTHER PUBLICATIONS

Sony: "YouTube Content Now Available on Sony Bravia Internet Video Link", Jun. 5, 2008, XP002605062, retrieved from the Internet: URL:http://news.sel.sony.com/en/press_room/consumer/television/release/35397.html [retrieved on Sep. 23, 2010].

Apple Inc: "YouTube Live on Apple TV Today; Coming to iPhone on Jun. 29"; Jun. 20, 2007, XP002605063, retrieved from the Internet: URL:http://www.apple.com/pr/library/2007/06/20youtube.html [retrieved on Sep. 23, 2010].

Peter Corcoran et al: "Managing Digital Image Collections From Your TV-Set: A State-of-Art Review", Signals, Circuits and Systems, 2007. ISSCS 2007. International Symposi UM ON, IEEE, Jul. 1, 2007, pp. 1-4, XP031128525, ISBN: 978-1-4244-0968-6, p. 3, left-hand column, line 5-line 30.

DVB Organization: "cm-iptv0425.pd", DVB, Digital Video Broadcasting, c/o EBU-17A Ancienne Route—CH-1218 Grand Saconnex, Geneva—Switzerland, Mar. 20, 2008, XP017827607, p. 14.

* cited by examiner

TELEVISION SYSTEM AND METHOD FOR PROVIDING COMPUTER NETWORK-BASED VIDEO

CROSS REFERENCE TO RELATED APPLICATIONS

This patent application is a divisional of non-provisional application Ser. No. 12/273,686 filed Nov. 19, 2008 and claims priority to provisional application Ser. No. 61/095,022, filed Sep. 8, 2008, which is incorporated by reference in its entirety.

BACKGROUND

Present television set top boxes, (e.g., cable television receivers, satellite television receivers, etc.) and the like are not equipped to handle the wide array of potential video information sources (e.g., computer network-based video sources).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a television system and method for providing computer network-based video, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Computer access to websites through the Internet, where such websites have video sharing capability is increasing in popularity. For the following discussion, a Personal Video Sharing Service ("PVSS") is generally a networked system that operates to provide mechanisms to assist in the sharing of personal video content. For example, a PVSS may operate to receive video files from submitters (e.g., individual users), post such video files as available (e.g., to the general public or to a subscriber base), and provide for downloading and/or streaming such posted video files to requestors. Such PVSSs are presently accessed utilizing personal computers communicating with servers through the Internet. Such PVSSs may also be referred to as Video Exchange Portals ("VEP"). Examples of such PVSSs and/or VEPs may, for example, include: YouTube™, CNN Exchange™ (or iReport.com™), the AOL™ video site, Eefoof.com™ (or Vume.com™), Panjea.com™, Revver™, Blip.TV™, Dabble.com™, etc.

The following discussion will often utilize the phrase "television system". Such phrase generically refers to any of a variety of television systems or subsystems. For example and without limitation, a "television system" may refer to a television receiver component, such as a set top box ("STB") (e.g., a cable television receiver, a satellite television receiver, etc.), a personal video recorder ("PVR"), gaming console, etc. Also for example, such phrase may refer to a wholly integrated television system, for example including an integrated television display, audio output system and/or one or more receiver components. Additionally for example, such phrase may refer to electrical circuitry of a television receiver component or integrated television system.

Also, for the sake of illustrative clarity, a television system may be presented herein as comprising any of a variety of functional modules. Such modules may, for example, comprise various combinations of hardware and/or software. Thus, unless explicitly claimed, various aspects of the present invention should not be limited by any particular hardware and/or software implementation.

In addition, the illustrated boundaries between various modules may represent definite boundaries between hardware and/or software components, but need not be so definitive. As a non-limiting example, various illustrated modules may share various hardware and/or software components. For example, a plurality of the illustrated modules may be implemented by a single shared processor executing software instructions, some of which might be common to each of the plurality of modules. Thus, unless explicitly claimed, various aspects of the present invention should not be limited by arbitrary boundaries between modules.

Figure 1:
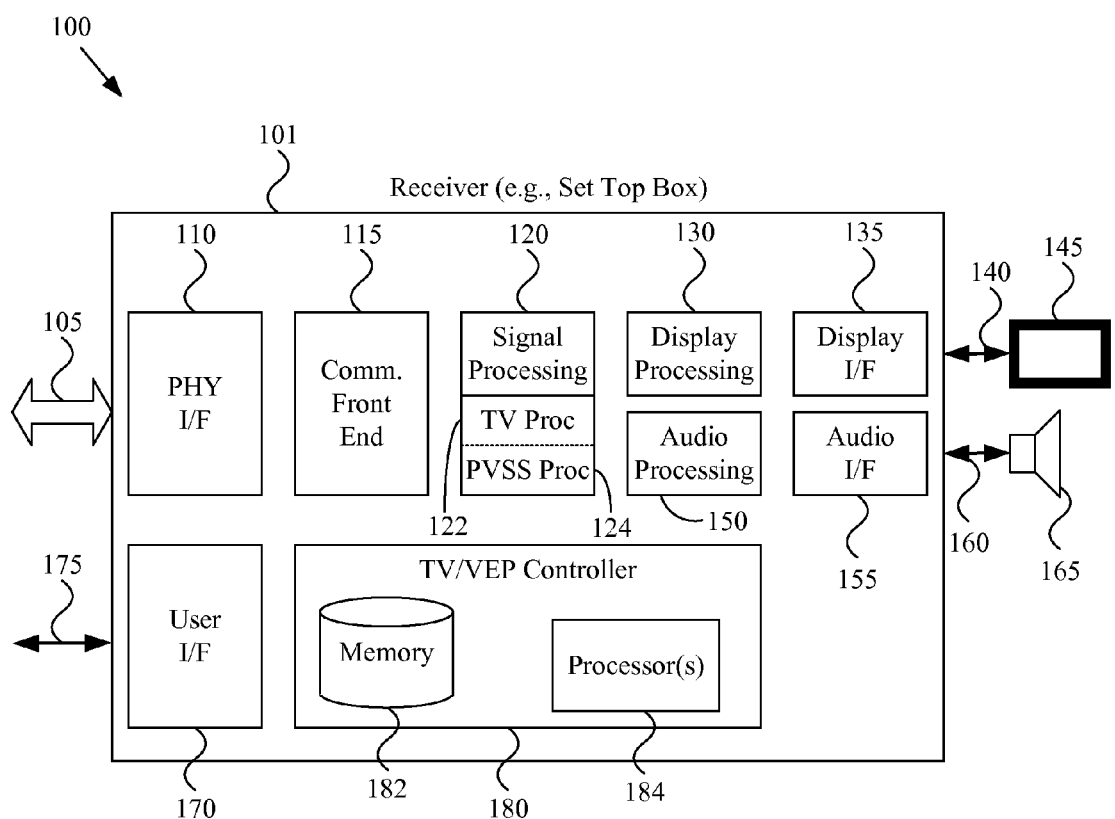
FIG. 1 is a diagram illustrating a non-limiting exemplary television system that operates to provide computer network-based video in accordance with various aspects of the present invention.

FIG. 1 is a diagram illustrating a non-limiting exemplary television system 100 that operates to provide computer network-based video in accordance with various aspects of the present invention. The exemplary television system 100 may, for example, comprise a television receiver 101, a video display 145 and a speaker system 165.

The television receiver 101 may, for example, be exemplified by a set top box (e.g., a cable television receiver, a satellite receiver, etc.), personal video recorder, gaming console, etc. The receiver 101 may be integrated with the video display 145 and/or speaker system 165 or may be an autonomous unit in its own housing. Note that the so-called television receiver 101 may also comprise various transmitter circuitry that operates to, for example, communicate information to audio and/or video information source devices.

The television receiver 101 may comprise one or more physical interface (PHY I/F) modules 110 and communication front end modules 115. Such modules may operate to establish, maintain and utilize any of a variety of communication links between the television receiver 101 and any of a variety of video source devices (e.g., associated with one or more PVSSs) through any of a variety of types of communication network. For example and without limitation, such PHY I/F module(s) 110 and/or communication front end module(s) 115 may operate to provide communication services corresponding to various protocol layers associated with any of a variety of communication protocols (e.g., cable television protocols, satellite television protocols, and computer networking protocols).

Such computer networking protocols may, for example and without limitation, comprise TCP/IP. The PHY I/F module(s) 110 and/or communication front end module(s) 115 may operate to communicate over any of a variety of computer networks (e.g., the Internet, metropolitan area networks, wide area networks, local area networks and/or personal area networks). The PHY I/F 110 and/or front end module(s) 115 may, for example and without limitation, operate to communicate in accordance with any of ITU H.323, Session Initiation Protocol (SIP), Real-time Transport Protocol (RTP), Media Gateway Control Protocol (MGCP)/MEGACO, etc.

The PHY I/F module(s) 110 may operate to communicate through any of a variety of communication media utilizing any of a variety of wired, optical and/or wireless protocols (e.g., Bluetooth, IEEE 802.3, IEEE 802.11, IEEE 802.15, IEEE 802.16, IEEE 802.20, GSM/GPRS/EDGE, CDMA/CDMA2000/WCDMA, TDMA/PDC, etc.

The television receiver 101 may comprise one or more signal processing modules 120. Such signal processing module(s) 120 may, for example, comprise one or more television signal processing modules 122 that operate to perform general television signal processing (e.g., associated with processing television signals received from standard television networks, like cable television, satellite television, traditional free television networks, etc.).

Such signal processing module(s) 120 may also, for example, comprise one or more PVSS processing modules 124 that operate to perform signal processing associated with one or more PVSSs. Such signal processing may, for example and without imitation, corresponding to various video and/or audio communication and/or compression standards (e.g., MPEG-2, MPEG-4, H.263, H.264, JPEG, TIFF, 3-D, 2-D, MDDI, MPE, AAC, QCELP, AMR, CMX, VoIP, etc.). A particular PVSS may, for example, be associated with one or more of such audio and/or video standards.

Such signal processing modules 120 may comprise, without limitation, one or more modules that operate to decode/decompress audio and/or video corresponding to particular standards that are generally associated with standard television signals and corresponding to particular standards that are generally associated with computer network video sources (e.g., MPEG-4, H.264 and the like). Such modules may, for example, be dedicated to particular standards or may be configurable (e.g., programmable) to decode/decompress video information corresponding to a plurality of standards.

Such signal processing modules 120 may comprise, without limitation, one or more modules that operate to filter audio and/or video signals and/or information corresponding to particular standards that are generally associated with standard television signals and corresponding to particular standards that are generally associated with computer network video sources (e.g., MPEG-4, H.264 and the like). Such modules may, for example, be dedicated to particular standards or may be configurable (e.g., programmable) to filter audio and/or video signals and/or information corresponding to a plurality of standards.

Such signal processing modules 120 may comprise, without limitation, one or more modules that operate to buffer audio and/or video signals corresponding to particular standards that are generally associated with standard television signals and corresponding to particular standards that are generally associated with computer network video sources (e.g., MPEG-4, H.264 and the like). Such modules may, for example, be dedicated to particular standards or may be configurable (e.g., programmable) to filter audio and/or video information corresponding to a plurality of standards.

A particular PVSS may be associated with any of a variety of PVSS characteristics. For example and without limitation, a PVSS may be associated with one or more computer network addresses (e.g., IP addresses, LAN addresses, etc.). Also for example, a PVSS may be associated with a respective secure access and/or secure communication procedure, particular user interface procedures, etc.

The television receiver 101 may comprise one or more display processing module(s) 130 that operate to manage the display of one or more videos. As a non-limiting example, a display processing module 130 may operate to fit a particular PVSS video to the display 145 or a portion of the display 145. Also for example, a display processing module 130 may operate to provide simultaneous display of multiple videos to the display 145 simultaneously (e.g., a plurality of PVSS videos or a PVSS video and a standard television video).

The television receiver 101 may also comprise one or more audio processing modules 130 that operate to manage the audio presentation of audio associated with one or more videos. As a non-limiting example, an audio processing module 130 may operate to present stereo and/or surround sound associated with one or more videos. For example, an audio processing module 150 may operate to provide a first set of audio signals to one or more speakers and a second set of audio signals to a wired and/or wireless headset.

The television receiver 101 may, for example, comprise one or more display interface modules 135 that operate to interface with (e.g., provide video driver signals 140 to) one or more display devices 145. For example, the display interface module(s) 135 may operate to provide any of a variety of component and/or composite video signals to one or more display devices 145.

The television receiver 101 may additionally, for example, comprise one or more audio interface modules 135 that operate to interface with (e.g., provide audio driver signals 160 to) one or more audio presentation devices 165 (e.g., speakers, headsets, etc.). For example, the audio interface module(s) 155 may operate to provide any of a variety of stereo and/or surround sound signals to one or more audio output devices 165.

The television receiver 101 may further, for example, comprise one or more user interface modules 170. The user interface module(s) 170 may operate to provide a user interface to a user of the television system 100 (or television receiver 101). A user interface may comprise any of a variety of characteristics. For example, the user interface module(s) 170 may operate to provide a graphical user interface to a user. For example, the user interface module(s) 170 may interact with the display processing module 130 to output a graphical user interface image on the display 145. The user interface module(s) 170 may establish one or more communication links 175 with one or more user input devices (e.g., a television remote control, cursor control device, mouse device, track ball device, light pen, etc.) to obtain information from a user as to a desired course of action. In an exemplary scenario, the user interface module(s) 170 may interact with the display processing module(s) 130 to generate a graphical user interface image on the display 145 and receive a signal indicative of user interaction with the GUI image through a communication link 175 to a remote control device (e.g., a television remote control, universal remote control, etc.).

The television receiver 101 may, for example, comprise one or more TV/VEP Controller modules 180. The TV/VEP Control module(s) 180 may generally, for example, manage the overall operation of the receiver 101. Such overall operation may include, without limitation, managing user interface activities, managing communication activities between the receiver 101 and any PVSS/VEP, managing video and/or audio signal processing activities, managing device configuration activities, managing video and/or audio output activities, etc.

The TV/VEP controller module(s) 180, as with any of the modules discussed herein, may be implemented in hardware and/or software. For example, the exemplary TV/VEP controller module(s) 180 illustrated in FIG. 1 is implemented using a processor 184 executing software instructions stored in a memory 182.

Various examples of the functionality performed by the previously discussed modules will now be presented with reference to FIGS. 2-5.

Figure 2:
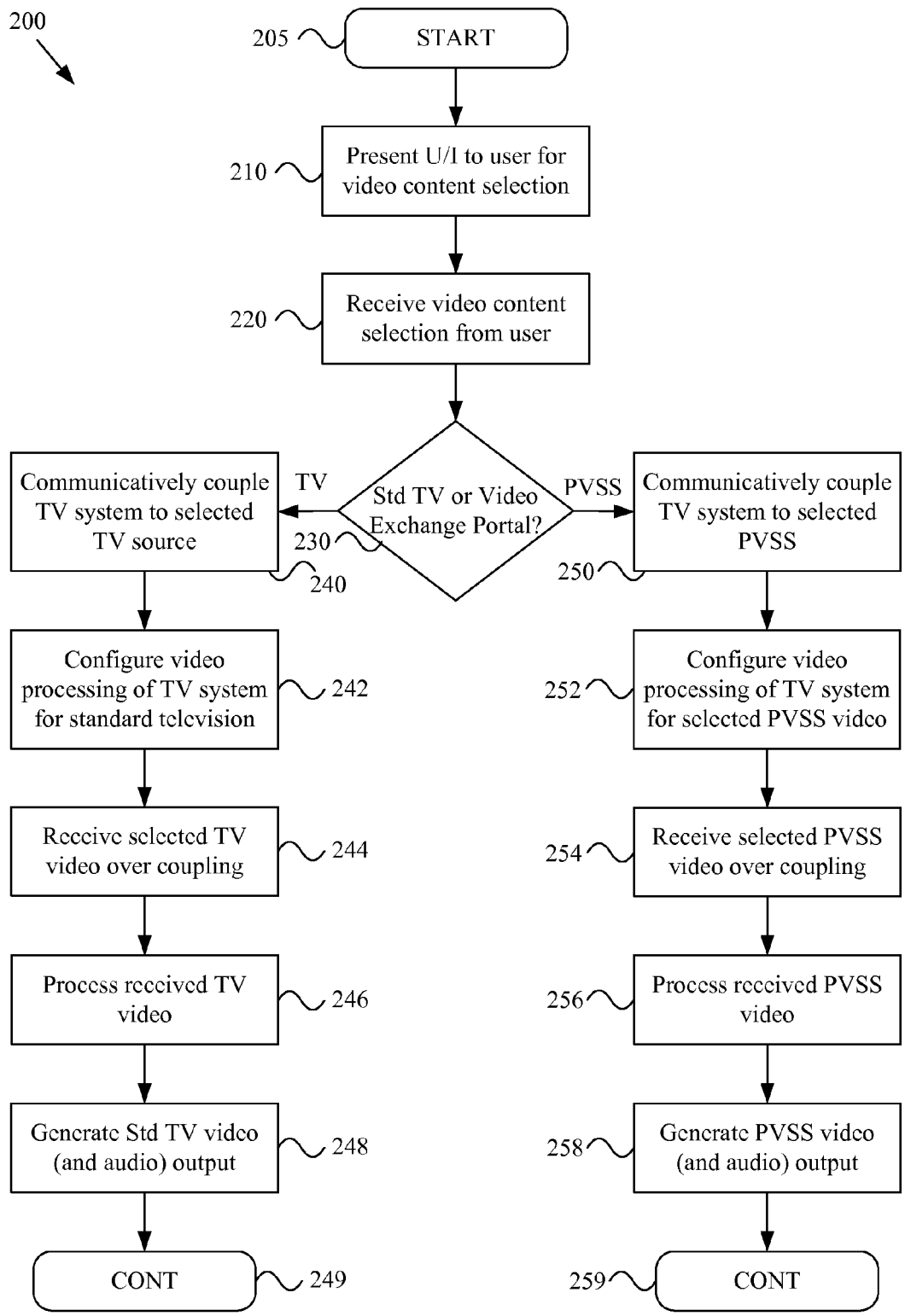
FIG. 2 is an exemplary flow diagram illustrating a method, in a television system, for providing computer network-based video, in accordance with various aspects of the present invention.

FIG. 2 is an exemplary flow diagram illustrating a method 200, in a television system (e.g., the television system 100 illustrated in FIG. 1 and/or the television system 600 illustrated in FIG. 6), for providing computer network-based video, in accordance with various aspects of the present invention.

The exemplary method 200 may begin executing at step 205. The exemplary method 200 may begin executing in response to any of a variety of causes or conditions. For example and without limitation, the exemplary method 200 may begin executing in response to a reset or power-up condition, a user input, a user or system command to present a user interface to a user (e.g., a GUI), continued execution flow from another method, a detected operating condition of a television system, a signal received at a television system, etc. The scope of various aspects of the present invention should not be limited by any particular initiating causes and/or conditions unless explicitly claimed.

The exemplary method 200 may, at step 210, comprise presenting a user interface to a user with which the user may specify video content to view. For example, step 210 may comprise providing a graphical user interface for the user to specify a PVSS.

Figures 3, 4:
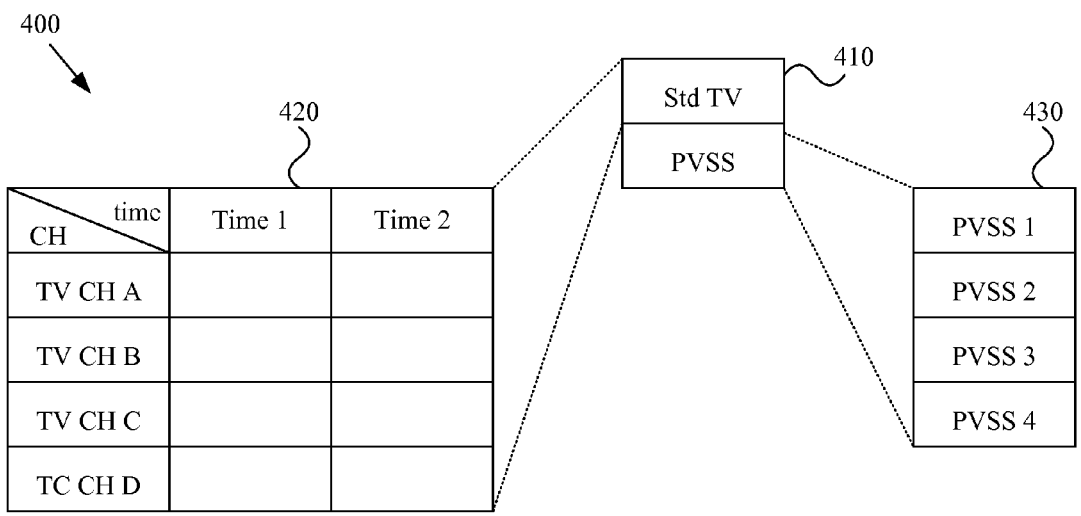
FIG. 3 is a diagram illustrating an exemplary graphical user interface, in accordance with various aspects of the present invention.
FIG. 4 is a diagram illustrating an exemplary graphical user interface, in accordance with various aspects of the present invention.

Such a graphical user interface may comprise any of a variety of characteristics, a non-limiting example of which is illustrated at FIG. 3. FIG. 3 is a diagram illustrating an exemplary graphical user interface format 300, in accordance with various aspects of the present invention.

The GUI format 300 comprises a video content selection matrix that presents selections corresponding to, at least, standard television channel offerings and PVSSs. For example, the GUI format 300 shows a first portion comprising graphical rows associated with standard television channels (or offerings) and columns associated with time-of-day (or time windows). The GUI format 300 also comprises a second portion comprising a plurality of graphical rows associated with respective PVSSs. Such graphical rows might, for example, be associated with time-of-day (or time windows) or might not be associated with any particular time parameter. Such time-of-day association may, for example, depend on whether a PVSS has particular video offerings associated with time-of-day.

Another non-limiting GUI example is illustrated at FIG. 4. FIG. 4 is a diagram illustrating an exemplary graphical user interface format 400, in accordance with various aspects of the present invention.

The GUI format 400 comprises a nested menu structure. For example, the GUI format 400 comprises a first nested menu level 410 at which a user may select between different types of video content (e.g., a first type of video content corresponding to PVSS content and a second type of video content different from PVSS content, for example, standard television content). The GUI format 400 may also comprise a second nested menu level, at least one menu of which 430 comprises a plurality of menu selections corresponding to respective PVSSs. Another menu 420 of the second nested menu level may comprise a plurality of menu selections corresponding to respective video sources different from PVSSs (e.g., standard television offerings, movie channels, pay-per-view offerings, etc.).

Though not illustrated in FIGS. 3 and 4, the GUI provided at step 210 may provide a user interface mechanism by which a user may select a desired video offering (e.g., a specific video file and/or stream) from a selected PVSS. For example, such mechanism may present a matrix list of such video offerings. Also for example, the GUI format (e.g., as that 400 illustrated in FIG. 4) may comprise a third level associated with selection of a respective PVSS at a menu 430 of a second menu level. Such a menu level may comprise characteristics of a standard (or generally consistent) configuration for all PVSSs, or such a menu level may comprise custom features that are specifically (or exclusively) related to particular respective PVSSs. For example, selection of a PVSS at the PVSS menu 430 may cause presentation of a third menu layer that specifies specific categories of video content in accordance with the specific video classification system of the selected PVSS. Such categories may then, for example, be associated with their own respective menus of specific video files.

In another example, the method 200 may comprise providing a user interface with which a user may specify characteristics of the GUI. For example, the method 200 may comprise interfacing with a user to determine which PVSSs to list in a GUI or which sub-menus or menu structure to utilize for a particular PVSS or group of PVSSs. The method 200 may, for example, comprise interacting with a user to determine which PVSSs to display in a GUI, respective labels or icons or other graphical characteristics associated with the PVSSs, respective communication network (e.g., computer network) addresses associated with the PVSSs, etc. Such labels, icons or other graphical characteristics may be utilized in a GUI to distinguish between different PVSSs or types of PVSSs. Also for example, the method 200 may comprise interacting with a user to specify GUI characteristics distinguishing between PVSSs and non-PVSS video sources (e.g., standard television sources, movie sources, pay-per-view sources, etc.).

In another example, such GUI customization may also be established through interaction with a particular PVSS. For example, a system implementing the method 200 may comprise communicating with one or more PVSSs automatically (i.e., without direct user interaction) to establish GUI features (e.g., matrix and/or menu structures). For example, a user may specify initial characteristics of a particular PVSS (e.g., network address), and the system may then utilize such address to establish a communication link with the particular PVSS to exchange information regarding available video content, categories of video content, secure access information, secure communication details, protocols, etc.). For example, the method 200 may also comprise translating between web-based U/I features (e.g., hot links, etc.) and U/I features compatible with the GUI. Such translated features may then be incorporated into the GUI.

In yet another example, a GUI provided at step 210 may comprise graphical images other than those directed related to one or more PVSSs. For example, a PVSS may provide graphical images associated with utilization of the PVSS, general information, advertising information, etc. Step 210 may comprise presenting such graphical images in the GUI, filtering out such graphical images and/or replacing all or a portion of such images. In a non-limiting example, step 210 may comprise removing graphical information from a PVSS that is not directly related to available video content and inserting graphics generated by the television system implementing the method 200. For example, step 210 may comprise generating informational and/or advertising graphics associated with the television system (or provider thereof) instead of those associated with one or more PVSSs or television stations.

Referring to the exemplary system 100 discussed previously, various aspects of step 210 may be performed, at least in part, by the user interface module(s) 170 and the display interface module(s) 135, and may also be performed under the guidance of the TV/VEP controller module 180. Additionally, the communication aspects discussed above may, for example, be performed by the PHY I/F module(s) 110 and front end communication module(s) 115.

In general, step 210 may comprise presenting a user interface to a user with which the user may select video content to view (e.g., from at least one or more PVSSs). Thus, the scope of various aspects of the invention should not be limited by characteristics of the specific examples presented above unless explicitly claimed.

The exemplary method 200 may, at step 220, comprise receiving a user input indicating selection of a personal video sharing service (PVSS). For example, in a scenario where step 210 comprises providing a GUI to a user, step 220 may comprise receiving a user input indicating selection of a PVSS by, at least in part, receiving such user input via the GUI. Similarly, step 220 may comprise receiving a user input (e.g., via a GUI) indicating selection of a particular video available from a PVSS (e.g., a previously selected PVSS or group of PVSSs).

For example, step 220 may comprise receiving such user input from a remote control device or from a user input feature on a receiver chassis or television system chassis implementing the exemplary method 200. For example, step 220 may comprise receiving a signal that comprises characteristics exclusively dedicated to a user specifying a desire to view video content from a PVSS, characteristics exclusively dedicated to a user specifying a desire to view video content from a particular PVSS and/or characteristics exclusively dedicated to a user specifying a desire to view particular video content from a particular PVSS. Such a signal may, for example, be associated with a GUI menu selection, a pushed button on a housing and/or remote control device, a selection on a wireless communication device communicatively coupled to the television system implementing the method 200, etc.

Figure 5:
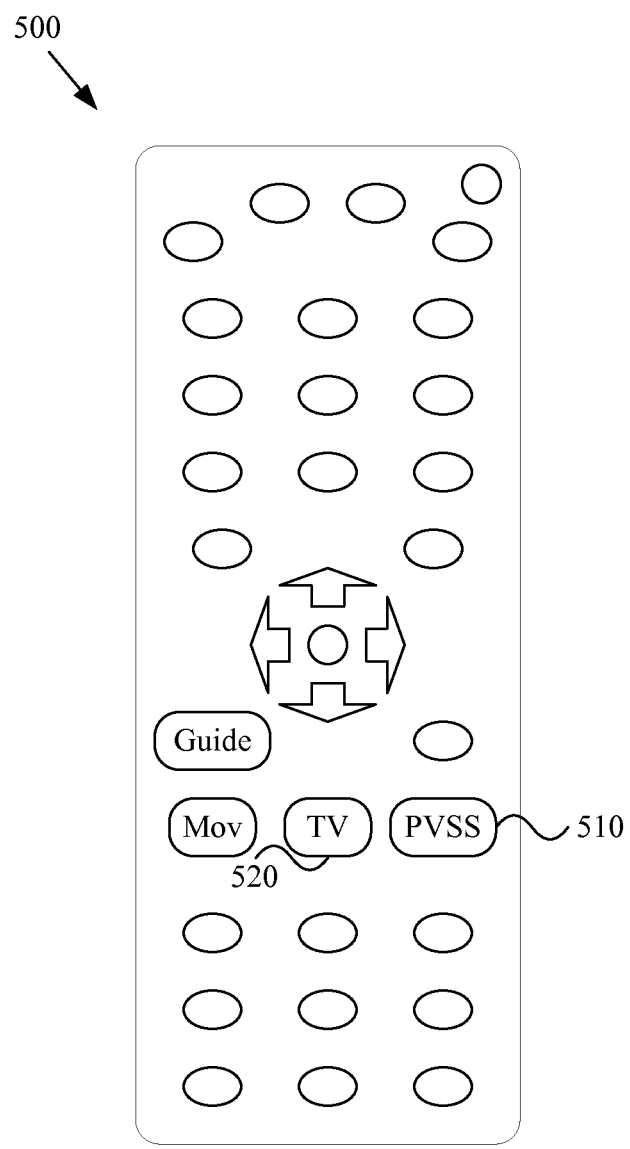
FIG. 5 is a diagram illustrating an exemplary television system remote control device, in accordance with various aspects of the present invention.

FIG. 5 is a diagram illustrating an exemplary television system remote control device 500, in accordance with various aspects of the present invention. The exemplary remote control device 500 may, for example, comprise a specific feature 510 (e.g., a pushbutton) that is exclusively dedicated (e.g., permanently and/or temporarily, for example through programming) to user specification of video from one or more PVSSs. In a non-limiting exemplary scenario, a user may activate a PVSS button 510 of the remote control 500, which in turn communicates a signal to a television system, where the signal comprises characteristics (e.g., general waveform characteristics and/or data) indicative of user specification of PVSS video content. Such a television system may then, for example, analyze the characteristics of the signal, determine that a user has specified viewing of PVSS video content, and respond accordingly (e.g., by presenting a user interface to the user that comprises features configured to assist the user in specifying particular video content from one or more PVSSs).

Referring to the exemplary system 100 discussed previously, various aspects of step 220 may be performed, at least in part, by the user interface module(s) 170 and the display interface module(s) 135, and may also be performed under the guidance of the TV/VEP controller module 180. Additionally, the communication aspects discussed above may, for example, be performed by the PHY I/F module(s) 110, front end communication module(s) 115 and/or user I/F module(s) 170

In general, step 220 may comprise receiving a user input indicating selection of a personal video sharing service (PVSS) and/or a particular video thereof. Thus, the scope of various aspects of the invention should not be limited by characteristics of the specific examples presented above unless explicitly claimed.

As discussed previously, a user may utilize a user interface device (e.g. a remote control device) to specify receiving video content from a PVSS. Similarly, the user may specify receiving video from other sources. As a non-limiting example, as illustrated in FIG. 5, a remote control 500 may comprise one or more features (e.g., one or more pushbuttons) dedicated to selection of non-PVSS content (e.g., a TV button 520, a Movie button, etc.). The exemplary method 200 may, at step 230, comprise determining whether a user has selected PVSS video content (e.g., from a Video Exchange Portal (VEP)) or video from another source, such as a standard television source. Step 230 may then comprise directing execution flow control of the exemplary method 200 accordingly.

If, for example, step 230 determines that a user has indicated PVSS operation, then step 230 may direct execution flow to step 250. Alternatively, if step 230 determines that a user has indicated standard television operation, then step 230 may direct execution flow to step 240. Although only two options are presented in the exemplary method 200, only two options are shown for illustrative clarity. The exemplary method 200 may, of course, be extended to more than two options.

Referring to the exemplary system 100 discussed previously, various aspects of step 230 may be perform, at least in part, by the TV/VEP controller module 180.

The exemplary method 200 may, at step 250, comprise (e.g., in response to a user input received at step 220) communicatively coupling the television system (e.g., a set top box, PVR, etc.) implementing the method 200 to a selected PVSS (or PVSS associated with a selected PVSS video). For example, in an exemplary scenario where the PVSS is associated with a particular computer network (e.g., the Internet), step 250 may comprise communicatively coupling to the PVSS through the computer network.

Step 250 may comprise communicatively coupling the television system implementing the method 200 to a PVSS using any of a variety of communication media and/or communication protocols, non-limiting examples of which were provided previously.

Referring to the exemplary television system 100 discussed previously, various aspects of step 250 may be performed by any of a variety of modules of the exemplary television system 100. For example and without limitation, the TV/VEP controller 180 may direct one or more communication front end modules 115 and/or one or more PHY I/F modules 110 to establish one or more communication links 105 with the PVSS.

In general, step 250 may comprise communicatively coupling the television system to one or more PVSSs. Thus, the scope of various aspects of the invention should not be limited by characteristics of the specific examples presented above unless explicitly claimed.

The exemplary method 200 may, at step 252, comprise configuring video processing of the television system for processing video information received from a PVSS (e.g., a PVSS specified at 220 and/or a PVSS associated with video content specified at step 220). Such configuring may comprise performing any of a variety of video processing configuration activities.

For example and without limitation, in an exemplary scenario, step 252 may comprise selecting a particular type of video decoding from a plurality of selectable types of video decoding to utilize for decoding (e.g., decompressing, error detection/correction decoding, etc.) video information received from a PVSS (e.g., particular selected video from a PVSS or all video from a selected PVSS). For example, in a particular television system implementing the method 200, video information from a PVSS may be decoded differently than video information from a non-PVSS source.

In such an exemplary scenario, step 252 may also comprise determining how video information received from the PVSS should be routed in a television system implementing the exemplary method 200. For example, in a particular television system implementing the method 200, video information from a PVSS may be routed differently through the television system than video information from a non-PVSS source.

For example, in an exemplary scenario, step 252 may comprise selecting a video decoder from a plurality of selectable decoders to utilize for decoding (e.g., decompressing, error detection/correction decoding, video information received from a PVSS (e.g., particular selected video from a PVSS or all video from a selected PVSS). In such an exemplary scenario, step 252 may also comprise routing video information received from the PVSS to and/or from the selected decoder. For example, in a particular television system implementing the method 200, video information from a PVSS (or particular types of video information from a PVSS) may be decoded using different decoders than video information from a non-PVSS source.

For example, in another exemplary scenario, step 252 may comprise configuring a configurable (e.g., programmable) decoder to utilize for decoding video information received from a PVSS (e.g., particular selected video from a PVSS or all video from a selected PVSS). In such an exemplary scenario, step 252 may also comprise routing video information received from the PVSS to and/or from the configured decoder. For example, in a particular television system implementing the method 200, video information from a PVSS (or particular types of video information from a PVSS) may be decoded using a different decoder configuration than video information from a non-PVSS source.

Also for example, in an exemplary scenario, step 252 may comprise selecting a video filter from a plurality of selectable filters to utilize for filtering (e.g., noise filtering, interpolation filtering, etc.) video information received from a PVSS (e.g., particular selected video from a PVSS or all video from a selected PVSS). In such an exemplary scenario, step 252 may also comprise routing video information received from the PVSS to and/or from the selected filter. For example, in a particular television system implementing the method 200, video information from a PVSS (or particular types of video information from a PVSS) may be filtered using different filters than video information from a non-PVSS source.

For example, in another exemplary scenario, step 252 may comprise configuring a configurable (e.g., programmable) filter to utilize for filtering video information received from a PVSS (e.g., particular selected video from a PVSS or all video from a selected PVSS). In such an exemplary scenario, step 252 may also comprise routing video information received from the PVSS to and/or from the configured filter. For example, in a particular television system implementing the method 200, video information from a PVSS (or particular types of video information from a PVSS) may be filtered using a different filter configuration than video information from a non-PVSS source.

In a further example, step 252 may comprise configuring one or more display processing modules 130 and/or audio processing modules 150 to perform appropriate display and/or audio output processing associated with video information received from a PVSS (e.g., particular selected video from a PVSS or all video from a selected PVSS). For example, PVSS video content may be presented on a display in a manner different from other types of video content (e.g., with different framing characteristics, different blending characteristics, different spatial and/or temporal resolutions, different color pallets, etc.).

Referring to the exemplary television system 100 discussed previously, various aspects of step 252 may be performed by any of a variety of modules of the exemplary television system 100. For example and without limitation, the TV/VEP controller 180 may operate to direct one or more signal processing modules 120 (e.g., one or more PVSS signal processing modules 124) to perform the previously discussed decoding and/or decoder configuring. Also for example, the TV/VEP controller 180 may operate to direct various modules of the television system 100 (e.g., the front end communication module(s) 115, PHY I/F module(s) 110 and the signal processing module(s) 120 to perform the previously discussed routing. Further for example, the TV/VEP controller 180 may operate to direct and/or configure the display I/F module(s) 135 and/or audio I/F module(s) 155 to perform the desired display and/or audio output processing.

In general, step 252 may comprise configuring video processing of the television system for processing video information received from a PVSS. Thus, the scope of various aspects of the invention should not be limited by characteristics of the specific examples presented above unless explicitly claimed.

The exemplary method 200 may, at step 254, comprise receiving video from a PVSS (e.g., receiving video from a selected PVSS, receiving selected video from a PVSS and/or receiving selected video from a selected PVSS). Step 254 may comprise receiving such video from a PVSS in various manners. For example and without limitation, step 254 may comprise receiving a requested video file from the PVSS (e.g., a download) through a communication network (e.g., through a computer network, for example, the Internet). Also for example, step 254 may comprise receiving requested video content in a streamed format from the PVSS.

Referring to the exemplary television system 100 discussed previously, various aspects of step 254 may be performed by any of a variety of modules of the exemplary television system 100. For example and without limitation, communication front end module(s) 115 and the PHY I/F module(s) 110 may operate to receive the video from a PVSS through one or more communication links 105.

In general, step 254 may comprise receiving video from a PVSS. Thus, the scope of various aspects of the invention should not be limited by characteristics of the specific examples presented above unless explicitly claimed.

The exemplary method 200 may, at step 256, comprise processing the video that was received at step 254 (e.g., processing video received from a PVSS in accordance with the processing configuration established at step 252).

Referring to the exemplary television system 100 discussed previously, various aspects of step 256 may be performed by any of a variety of modules of the exemplary television system 100. For example and without limitation, the signal processing module(s) 120 (e.g., PVSS processing module(s) 124) may operate to process the video received from a PVSS. Also, for example, in various exemplary scenarios, various standard television processing modules may also be utilized, depending on the processing needs associated with a particular type of received video.

In general, step 256 may comprise processing video received from a PVSS. Thus, the scope of various aspects of the invention should not be limited by characteristics of the specific examples presented above unless explicitly claimed.

The exemplary method 200 may, at step 258, comprise generating video and/or audio output signals (e.g., display driver signals and/or audio output signals) for the video processed at step 256. For example, such display driver signals may be component and/or composite video signals, HDMI signals, etc. Also for example, such audio output signals may be analog and/or digital audio output signals to an audio system and/or directly to audio speakers.

Referring to the exemplary television system 100 discussed previously, various aspects of step 258 may be performed by any of a variety of modules of the exemplary television system 100. For example and without limitation, the display processing module(s) 130 and/or display interface module(s) 135 may operate to generate the video output signals. Also for example, the audio processing module(s) 150 and/or the audio interface module(s) 155 may operate to generate the audio output signals.

In general, step 258 may comprise generating video and/or audio output signals for the video processed at step 256. Thus, the scope of various aspects of the invention should not be limited by characteristics of the specific examples presented above unless explicitly claimed.

The exemplary method 200 may, at step 259, comprise continuing operation. Such continued operation may, for example, comprise looping operation back up to any of the previous steps, continuing execution flow to additional processing steps, etc.

As discussed previously, if step 230 determines that a user has indicated standard television operation, then step 230 may direct execution flow to step 240.

The exemplary method 200 may, at step 240, comprise (e.g., in response to a user input received at step 220) communicatively coupling the television system (e.g., a set top box, PVR, etc.) implementing the method 200 to a selected television source). For example, in an exemplary scenario where the TV source is associated with a particular television network (e.g., a cable and/or satellite television network), step 250 may comprise communicatively coupling to the TV source through the cable and/or satellite television network. Note that in various exemplary scenarios, a television source may be communicatively coupled to through a computer network (e.g., the Internet). In various scenarios, step 240 may comprise many of the characteristics discussed previously with regard to step 250.

Step 240 may comprise communicatively coupling the television system implementing the method 200 to a TV source using any of a variety of communication media and/or communication protocols discussed previously.

Referring to the exemplary television system 100 discussed previously, various aspects of step 240 may be performed by any of a variety of modules of the exemplary television system 100. For example and without limitation, the TV/VEP controller 180 may direct one or more communication front end modules 115 and/or one or more PHY I/F modules 110 to establish one or more communication links 105 with the TV source.

In general, step 240 may comprise communicatively coupling the television system to one or more TV sources. Thus, the scope of various aspects of the invention should not be limited by characteristics of the specific examples presented above unless explicitly claimed.

The exemplary method 200 may, at step 242, comprise configuring video processing of the television system for processing video information received from a TV source (e.g., a cable television source, satellite television source, stand free TV RF source, etc.). Such configuring may comprise performing any of a variety of video processing configuration activities.

For example and without limitation, in an exemplary scenario, step 242 may comprise selecting a particular type of video decoding (e.g., decompressing, error detection/correction decoding, etc.) from a plurality of selectable types of video decoding to utilize for decoding video information received from a TV source (e.g., particular selected video from a TV source or all video from a selected TV source). For example, in a particular television system implementing the method 200, video information from a TV source may be decoded differently than video information from a PVSS source or from other TV sources.

In such an exemplary scenario, step 242 may also comprise determining how video information received from the TV source should be routed in a television system implementing the exemplary method 200. For example, in a particular television system implementing the method 200, video information from a TV source may be routed differently through the television system than video information from a PVSS source or another TV source.

For example, in an exemplary scenario, step 242 may comprise selecting a video decoder from a plurality of selectable decoders to utilize for decoding video information received from the TV source (e.g., particular selected video from a TV source or all video from a selected TV source). In such an exemplary scenario, step 242 may also comprise routing video information received from the TV source to and/or from the selected decoder. For example, in a particular television system implementing the method 200, video information from a TV source (or particular types of video information from a TV source) may be decoded using different decoders than video information from a PVSS source or video information from another TV source.

For example, in another exemplary scenario, step 242 may comprise configuring a configurable (e.g., programmable) decoder to utilize for decoding (e.g., decompressing, error detection/correction decoding, etc.) video information received from a TV source (e.g., particular selected video from a TV source or all video from a selected TV source). In such an exemplary scenario, step 242 may also comprise routing video information received from the TV source to and/or from the configured decoder. For example, in a particular television system implementing the method 200, video information from a TV source (or particular types of video information from a TV source) may be decoded using a different decoder configuration than video information from a PVSS source or another TV source. Note that the configurable decoder may, for example, be the same configurable decoder that is configured at step 252.

Also for example, in an exemplary scenario, step 242 may comprise selecting a video filter from a plurality of selectable filters to utilize for filtering (e.g., noise filtering, interpolation filtering, etc.) video information received from a TV source (e.g., particular selected video from a TV source or all video from a selected TV source). In such an exemplary scenario, step 242 may also comprise routing video information received from the TV source to and/or from the selected filter. For example, in a particular television system implementing the method 200, video information from a TV source (or particular types of video information from a TV source) may be filtered using different filters than video information from a PVSS source or another TV source.

For example, in another exemplary scenario, step 242 may comprise configuring a configurable (e.g., programmable) filter to utilize for filtering video information received from a TV source (e.g., particular selected video from a TV source or all video from a selected TV source). In such an exemplary scenario, step 242 may also comprise routing video information received from the TV source to and/or from the configured filter. For example, in a particular television system implementing the method 200, video information from a TV source (or particular types of video information from a TV source) may be filtered using a different filter configuration than video information from a PVSS source or another TV source. Note that the configurable filter may, for example, be the same configurable decoder that is configured at step 252.

In a further example, step 242 may comprise configuring one or more display processing modules 130 and/or audio processing modules 150 to perform appropriate display and/or audio output processing associated with video information received from a TV source (e.g., particular selected video from a TV source or all video from a selected TV source). For example, TV source video content may be presented on a display in a manner different from other types of video content (e.g., with different framing characteristics, different blending characteristics, different spatial and/or temporal resolutions, different color pallets, etc.).

Referring to the exemplary television system 100 discussed previously, various aspects of step 242 may be performed by any of a variety of modules of the exemplary television system 100. For example and without limitation, the TV/VEP controller 180 may operate to direct one or more signal processing modules 120 (e.g., one or more TV signal processing modules 122) to perform the previously discussed decoding and/or decoder configuring. Also for example, the TV/VEP controller 180 may operate to direct various modules of the television system 100 (e.g., the front end communication module(s) 115, PHY I/F module(s) 110 and the signal processing module(s) 120) to perform the previously discussed routing. Further for example, the TV/VEP controller 180 may operate to direct and/or configure the display I/F module(s) 135 and/or audio I/F module(s) 155 to perform the desired display and/or audio output processing.

In general, step 242 may comprise configuring video processing of the television system for processing video information received from a TV source. Thus, the scope of various aspects of the invention should not be limited by characteristics of the specific examples presented above unless explicitly claimed.

The exemplary method 200 may, at step 244, comprise receiving video from a TV source (e.g., receiving video from a selected TV source, receiving selected video from a TV source and/or receiving selected video from a selected TV source). Step 244 may comprise receiving such video from a TV source in various manners. For example and without limitation, step 244 may comprise receiving a requested video file from the TV source (e.g., via a standard TV signals) through a communication network (e.g., through a cable television network, satellite television network, standard free RF television network, etc.).

Referring to the exemplary television system 100 discussed previously, various aspects of step 244 may be performed by any of a variety of modules of the exemplary television system 100. For example and without limitation, the communication front end module(s) 115 and the PHY I/F module(s) 110 may operate to receive the video from a TV source through one or more communication links 105.

In general, step 244 may comprise receiving video from a TV source. Thus, the scope of various aspects of the invention should not be limited by characteristics of the specific examples presented above unless explicitly claimed.

The exemplary method 200 may, at step 246, comprise processing the video that was received at step 244 (e.g., processing video received from a TV source in accordance with the processing configuration established at step 242).

Referring to the exemplary television system 100 discussed previously, various aspects of step 246 may be performed by any of a variety of modules of the exemplary television system 100. For example and without limitation, the signal processing module(s) 120 (e.g., TV source processing module(s) 122) may operate to process the video received from a TV source.

In general, step 246 may comprise processing video received from a TV source. Thus, the scope of various aspects of the invention should not be limited by characteristics of the specific examples presented above unless explicitly claimed.

The exemplary method 200 may, at step 248, comprise generating video and/or audio output signals (e.g., display driver signals and/or audio output signals) for the video processed at step 246. For example, such display driver signals may be component and/or composite video signals, HDMI signals, etc. Also for example, such audio output signals may be analog and/or digital audio output signals to an audio system and/or directly to audio speakers.

Referring to the exemplary television system 100 discussed previously, various aspects of step 248 may be performed by any of a variety of modules of the exemplary television system 100. For example and without limitation, the display processing module(s) 130 and/or display interface module(s) 135 may operate to generate the video output signals. Also for example, the audio processing module(s) 150 and/or the audio interface module(s) 155 may operate to generate the audio output signals.

In general, step 248 may comprise generating video and/or audio output signals for the video processed at step 246. Thus, the scope of various aspects of the invention should not be limited by characteristics of the specific examples presented above unless explicitly claimed.

The exemplary method may, at step 249, comprise continuing operation. Such continued operation may, for example, comprise looping operation back up to any of the previous steps, continuing execution flow to additional processing steps, etc.

Figure 6:
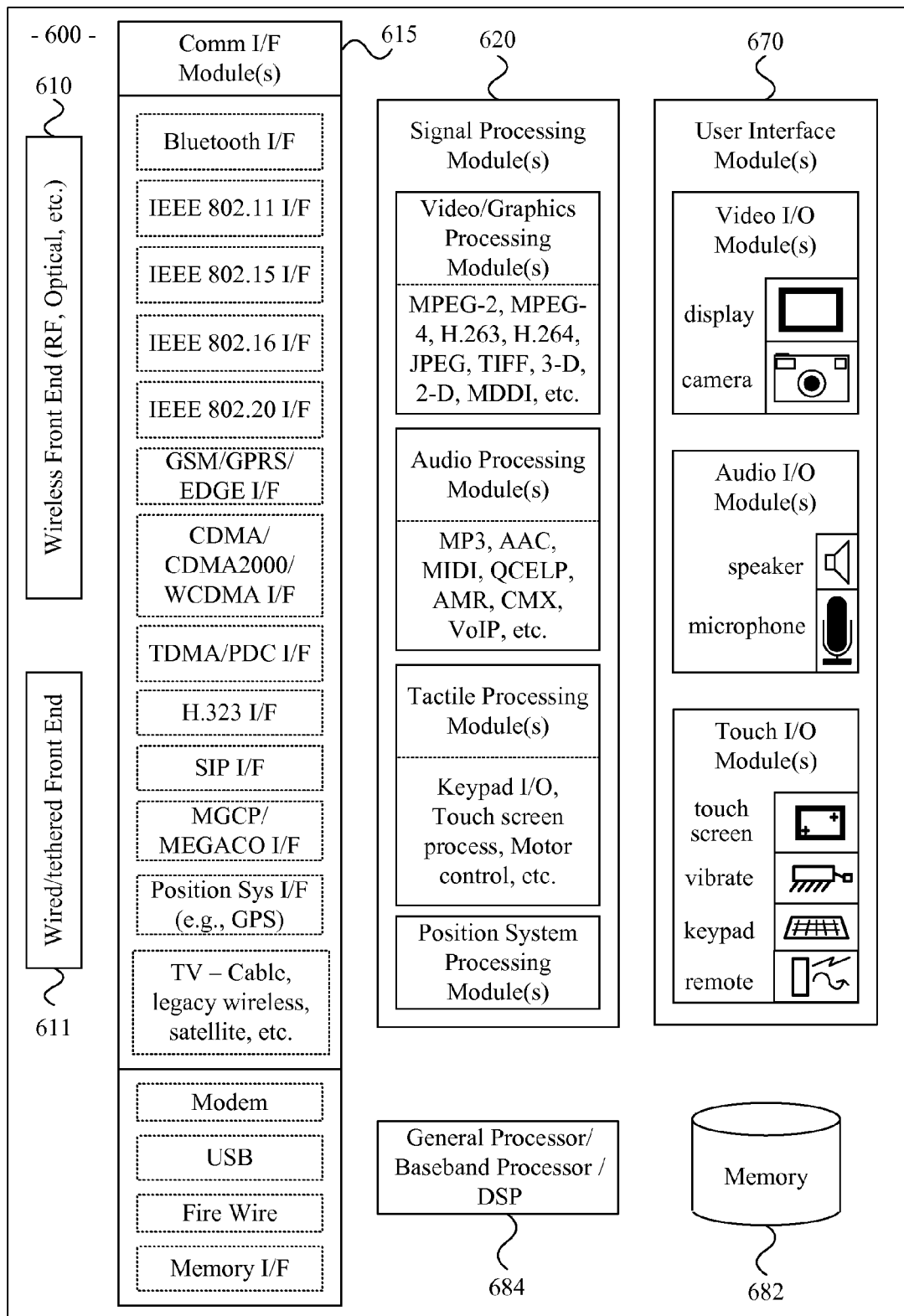
FIG. 6 is a diagram illustrating a non-limiting exemplary television system that operates to provide computer network-based video in accordance with various aspects of the present invention.

FIG. 6 is a diagram illustrating a non-limiting exemplary television system 600 that operates to provide computer network-based video in accordance with various aspects of the present invention. Various modules of the television system 600 may, for example, operate to perform any of the functionality discussed previously (e.g., with regard to the exemplary method 200). Also, various modules of the television system 600 may, for example, share characteristics with corresponding modules of the exemplary television system 100 illustrated in FIG. 1.

For example, the PHY I/F module(s) 110 and communication front end module(s) 115 of the television system 100 illustrated in FIG. 1 may share any or all characteristics with the wireless front end modules 610, wired/tethered front end modules 611 and communication interface modules 615 of the television system 600. Similarly, the signal processing module(s) 120 or the television system 100 illustrated in FIG. 1 may share any or all characteristics with the signal processing module(s) 620. Also, the user interface module(s) 170 of the television system 100 illustrated in FIG. 1 may share any or all characteristics with the user interface modules 670. The display interface module(s) 135 and audio interface module(s) 155 may share any or all characteristics with the video I/O module(s) and audio I/O module(s) illustrated in FIG. 6. Additionally, the TV/VEP Controller 180 may share any or all characteristics with the Processor 684 and/or Memory 682 of the television system 600 illustrated in FIG. 6.

In summary, various aspects of the present invention provide a television system and method for providing computer network-based video.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims Various implementations have been specifically described. However, many other implementations are also possible.

What is claimed is:

1. A television set top box (STB) in communication with a personal video sharing service, comprising:
at least one module comprising:
a first decoder configured to decode a first video corresponding to video information received from the personal video sharing service; and
a second decoder configured to decode a second video corresponding to video information received from a standard television source;
the at least one module operates to, at least:
receive a post indicating the video information received from the personal video sharing service is available;
receive the first video corresponding to video information from the personal video sharing service;
receive the second video corresponding to video information from the standard television source;
determine whether the first video and the second video corresponding to video information is from the personal video sharing service or the standard television source;
determine a routing of the first video to the first decoder in response determination of the first video corresponding to video information being received from the personal video sharing service to decode the first video for presentation to a user, and a routing of the second video to the second decoder in response determination of the second video corresponding to video information being received from the standard television source to decode the second video for presentation to the user; and
where the second video is decoded in a manner different from the first video.

2. The television set top box of claim 1, wherein the at least one module comprises a configurable video decoder; and the at least one module operates to:
configure the configurable video decoder in a first configuration to decode video information received from the personal video sharing service; and
configure the configurable video decoder in at least a second configuration, different from the first configuration, to decode video information received from a video source other than the personal video sharing service.

3. The STB of claim 1, wherein the first decoder is operable to decode a particular selected video from the personal video sharing service.

4. The STB of claim 1, wherein the first decoder is operable to decode all video provided from the personal video sharing service.

5. The STB of claim 1, wherein the at least one module determines a type of the video information and directs video information to the first decoder in response to the type of the video information.

6. The STB of claim 1, wherein the at least one module determines a routing of the video information to the first decoder in response the video information being received from the personal video sharing service.

7. The STB of claim 1, wherein the at least one module determines a routing of the video information to the first decoder in response to a type of the video information received from the personal video sharing service.

8. The STB of claim 1, wherein the at least one module determines a routing of the video information to the second decoder in response the video information being received from a source other than the personal video sharing service.

9. The STB of claim 2, wherein the first configuration is operable to decode a particular selected video from the personal video sharing service.

10. The STB of claim 2, wherein the first configuration is operable to decode all video provided from the personal video sharing service.

11. The STB of claim 2, wherein the at least one module identifies a type of video information and configures the configurable decoder in response to the type of the video information.

12. A television set top box (STB) in communication with a personal video sharing service, comprising:
at least one module comprising:
a first decoder configured to decode a first video corresponding to video information received from the personal video sharing service; and a second decoder configured to decode a second video corresponding to video information received from a standard television source;

the at least one module operates to, at least:
receive a post indicating the video information received from the personal video sharing service is available;
receive a user input indicating selection of at least one of: the personal video sharing service or a video provided by the personal video sharing service; and
in response to at least said user input:
communicatively couple the STB to the personal video sharing service;
communicate with the personal video sharing service to exchange secure access information;
communicate with the personal video sharing service to receive the first video corresponding to video information from the personal video sharing service; and
process the first video for presentation to the user;
wherein the at least one module further operates to configure video signal processing of the STB by, at least in part, operating to:
receive the second video corresponding to video information from the standard television source;
determine whether the first video and the second video corresponding to video information is from the personal video sharing service or the standard television source;
determine a routing of the first video to the first decoder in response determination of the first video corresponding to video information being received from the personal video sharing service to decode the first video for presentation to a user, and a routing of the second video to the second decoder in response determination of the second video corresponding to video information being received from the standard television source to decode the second video for presentation to the user; and
where the second video is decoded in a manner different from the first video.

13. The STB of claim 12, wherein the at least one module selects the decoder in response to framing characteristics of the video information.

14. The STB of claim 12, wherein the at least one module selects the decoder in response to blending characteristics of the video information.

15. The STB of claim 12, wherein the at least one module selects the decoder in response to spatial resolution of the video information.

16. A television set top box (STB) in communication with a personal video sharing service, comprising:

at least one module comprising:
a first decoder configured to decode a first video corresponding to video information received from the personal video sharing service; and
a second decoder configured to decode a second video corresponding to video information received from a standard television source;

the at least one module operates to, at least:
receive a post indicating the video information received from the personal video sharing service is available;
receive a user input indicating selection of at least one of: the personal video sharing service or a video provided by the personal video sharing service; and
in response to at least said user input:
communicatively couple the STB to the personal video sharing service;
communicate with the personal video sharing service to receive the first video corresponding to video information from the personal video sharing service; and
process the first video for presentation to the user;
wherein the at least one module further operates to configure video signal processing of the STB by, at least in part, operating to:
receive the second video corresponding to video information from the standard television source;
determine whether the first video and the second video corresponding to video information is from the personal video sharing service or the standard television source;
determine a routing of the first video to the first decoder in response determination of the first video corresponding to video information being received from the personal video sharing service to decode the first video for presentation to a user, and a routing of the second video to the second decoder in response determination of the second video corresponding to video information being received from the standard television source to decode the second video for presentation to the user; and
where the second video is decoded in a manner different from the first video.

17. The STB of claim 16, wherein the second decoder is configured to decode a particular selected video from a source other than the personal video sharing service.

18. The STB of claim 16, wherein the first decoder is configured to decode all video provided from the personal video sharing service.

* * * * *

UNITED STATES PATENT AND TRADEMARK OFFICE
CERTIFICATE OF CORRECTION

Page 1 of 1

PATENT NO.         : 9,479,814 B2
APPLICATION NO.    : 14/156974
DATED              : October 25, 2016
INVENTOR(S)        : Jeyhan Karaoguz It is certified that error appears in the above-identified patent and that said Letters Patent is hereby corrected as shown below:

On the Title Page

Item (12) and (72) Inventor: "Kararoguz" should be --Karaoguz--.

Signed and Sealed this
Sixth Day of December, 2016

Michelle K. Lee
*Director of the United States Patent and Trademark Office*